United States Patent
Pääjärvi

(10) Patent No.: US 8,441,817 B2
(45) Date of Patent: May 14, 2013

(54) HVDC SYSTEM INCLUDING SWITCHING ARRANGEMENTS TO SWITCH CURRENT FLOW DIRECTION

(75) Inventor: Bo Pääjärvi, Ludvika (SE)

(73) Assignee: ABB Technology Ltd., Zürich (CH)

( * ) Notice: Subject to any disclaimer, the term of this patent is extended or adjusted under 35 U.S.C. 154(b) by 756 days.

(21) Appl. No.: 12/158,738

(22) PCT Filed: Dec. 21, 2005

(86) PCT No.: PCT/SE2005/002012
§ 371 (c)(1),
(2), (4) Date: Aug. 25, 2009

(87) PCT Pub. No.: WO2007/073256
PCT Pub. Date: Jun. 28, 2007

(65) Prior Publication Data
US 2010/0046255 A1 Feb. 25, 2010

(51) Int. Cl.
*H02J 3/36* (2006.01)
(52) U.S. Cl.
USPC ............................................. 363/35; 363/37
(58) Field of Classification Search .................... 363/34, 363/35, 37
See application file for complete search history.

(56) References Cited

U.S. PATENT DOCUMENTS

| 3,600,662 A | | 8/1971 | Anwander |
| 4,375,612 A | * | 3/1983 | Wirth ............................ 318/767 |
| 4,459,492 A | * | 7/1984 | Rogowsky ...................... 307/82 |
| 5,612,859 A | * | 3/1997 | Kakalec et al. ................ 363/34 |
| 5,910,888 A | | 6/1999 | Weimers |
| 2010/0046255 A1 | * | 2/2010 | Paajarvi ......................... 363/35 |
| 2011/0310641 A1 | * | 12/2011 | Asplund et al. ................ 363/35 |

FOREIGN PATENT DOCUMENTS

WO WO-9857412 A1 12/1998

OTHER PUBLICATIONS

PCT/ISA/210—International Search Report—Sep. 18, 2006.
PCT/IB/373—International Preliminary Report on Patentability—Jun. 24, 2008.
PCT/ISA/237—Written Opinion of the International Searching Authority—Sep. 18, 2006.

* cited by examiner

*Primary Examiner* — Jeffrey Sterrett
(74) *Attorney, Agent, or Firm* — Venable LLP; Eric J. Franklin

(57) ABSTRACT

An HVDC network including a first station including a first converter, a second station including a second converter, each converter including non-extinguishable semiconducting elements. A first transmission conductor and a second transmission conductor. The first station includes a first switching arrangement.

8 Claims, 1 Drawing Sheet

HVDC SYSTEM INCLUDING SWITCHING ARRANGEMENTS TO SWITCH CURRENT FLOW DIRECTION

CROSS-REFERENCE TO RELATED APPLICATIONS

This is the national phase under 35 U.S.C. §371 of PCT/SE2005/002012 filed 21 Dec. 2005.

TECHNICAL FIELD

The present invention concerns high voltage direct current (HVDC) transmission. Especially the invention concerns an HVDC transmission network connecting a first AC network with a second AC network. The transmission network comprises at each end a station containing converter means for converting a DC current into an AC current and vice versa.

BACKGROUND OF THE INVENTION

From prior art is known the use of an HVDC network for transmission of electric power over long distances. An HVDC network consists of a rectifier station, a transmission line in the form of a cable or an overhead line, a station for inversion and one or more filters for eliminating harmonics generated during the inversion. In a common embodiment of an HVDC network, also known as classic HVDC, non-extinguishable semiconducting elements such as for instance thyristors are used both for rectification and inversion. Thyristors are capable of being fired but not capable of being extinguished. The commutation takes place near the zero crossing of the voltage, which zero crossing is determined by the ac voltage and the inverters. These converters are therefore referred to as line-commutated and also known as current source converters (CSC). The technique involves the inversion to consume reactive power and leads to harmonics sent out onto the network. In the following, converters which are used as rectifier or as inverter will be referred to as converters.

From prior art is known to arrange the HVDC transmission network with overhead lines. Such uninsulated overhead lines have been used to implement a direct voltage network interconnecting stations which may be located a very large distance apart, for example, 1000 km or more. However, such overhead lines have a significant disturbing influence upon the country and the environment. The alternative has been to use cables. Suitable cables comprise an inner conductor surrounded by a thick insulating layer formed by a paper impregnated by oil. These cable, however, are so costly that they are not a realistic alternative to overhead lines. Experiments have been carried out with cables having a conductor and an insulating layer on a polymer base surrounding the conductor. These experiments have revealed great problems in using this type of cable for HVDC transmission, since cavities are created in the insulating layer. A cavity causes a deformation of the electric field in the cable which leads to partial discharges, also known as space charges. These partial discharges create gases that attack the polymeric material. In a matter of time the insulating layer has been broken down and the cable has lost its insulating performance. The space charges are caused by the changes of polarity which the conductor is subjected to when the transmission direction of the effective power is changed. It is thus known to arrange overhead lines for transmitting HVDC on land, and cables having tailor made oil-impregnated insulating sheets at sea for electric power transmission between land areas separated by water.

From U.S. Pat. No. 5,910,888 (Wiemers) a plant for transmitting electric power is previously known. The object of the plant is to avoid the problems of cable breakdown in combination with HVDC. Hence, a Plant for transmission of HVDC is provided comprising voltage source converters (VSC). These converters are known not the change the polarity of the DC lines when the direction of the effective power transmission is changed.

Still there is a need within the HVDC technique industry to be able to produce a more cost effective classic HVDC using cables.

SUMMARY OF THE INVENTION

The present invention seeks to provide an improved HVDC network comprising two converter stations connected to each other by a first and a second transmission conductor where at least the first transmission conductor comprises a cable.

This object is achieved according to the invention by HVDC plant or by a method.

According to the invention each converter stations comprises a switching arrangement capable of directing the current flow of the first and second transmission conductor such that the potential of each transmission conductor is the same irrespective of the effective transmission direction. By such a switching arrangement resulting in the potential of each transmission conductor not being changed the first transmission conductor may comprise a cable with a polymeric insulation. Also the second transmission conductor in a symmetric HVDC network may comprise a polymeric insulated cable. The switching arrangement according to the invention makes possible the combination of a classic HVDC network with a cable having a polymeric insulation.

In an embodiment of the invention the HVDC system comprises a symmetrical monopolar HVDC system having a converter consisting of one 12-pulse converter in each converter station. A neutral ground of the converter is arranged in one end only. The converters are connected with two equal high voltage cables having a polymeric insulation. This structure provides a scheme with high transmission voltage, low current and thereby feasible cables with low transmission losses and eliminates return DC current through earth or sea.

The switching arrangement comprises in an embodiment of the invention two switches at each station. These switches are operated in coordination. The converter of the first station comprises a first DC connection with a first switch and a second DC connection with a second switch. In a first mode of operation representing an effective power transmission in a first direction the first switch makes contact of the first DC connection and the first transmission conductor. In this operation the second switch makes contact of the second DC connection and the second transmission conductor. The second station comprises an equivalent switching arrangement. Hence, a first current path between the first and second station comprises the first DC connection of the first station converter, the first transmission conductor and the first DC connection of the second station converter. A second current path is thus formed by the second DC connection of the first station converter, the second transmission conductor and the second DC connection of the second station converter.

In a second mode of operation representing an effective power transmission in a second direction, opposite the first direction, the first switch makes contact of the first DC connection and the second transmission conductor. In this operation the second switch makes contact of the second DC connection and the first transmission conductor. The second station comprises an equivalent switching arrangement.

Hence, in this operation a first current path between the first and second station comprises the first DC connection of the first station converter, the second transmission conductor and the first DC connection of the second station converter. A second current path is thus formed by the second DC connection of the first station converter, the first transmission conductor and the second DC connection of the second station converter. The switching maneuver takes place when the effective power transmission changes direction and the voltage is zero.

The switching arrangement causes the potential of the first and second transmission conductor never to change direction. Hence, the occurrence of space charges never exists in the embodiment according to the invention. This makes possible the use of a cable with an insulation comprising polymeric material. Cables of this type having a conductor surrounded by an insulating layer of polymer base may be produced at a far lower cost than the cables mentioned above which have a conductor surrounded by an insulating layer based on paper impregnated by oil. This means that such cables become an alternative to overhead lines and are attractive from a cost point of view. It is now possible to remove all the inconveniences of such overhead lines without any substantial negative consequences with respect to costs.

The invention is based upon the understanding that it is possible to use cables previously thought unsuitable for this purpose.

According to an embodiment of the invention, the cable comprises an extruded cable. Such a cable may be produced at a cost and a quality that it would be very advantageous to use. In an embodiment the insulation of the cable comprises a first layer of a semiconducting material surrounding the conductor, a second layer comprising a polymeric insulating material, and a third layer comprising a semiconducting material surrounding the insulating material. The purpose of the first and third layer is to smoothen the eclectic field in the cable. The adherence between the first and second layer and between the second and third layer must according to the invention be sufficient not to disengage by thermal or by mechanical forces such that cavities may be formed between the layers.

In a first aspect of the invention the object is achieved by an HVDC network comprising a first and second station each comprising a converter, and a first and second transmission conductor, wherein the first and second station comprises a switching arrangement for alternating the current flow between the first and second transmission conductor.

In a second aspect of the invention the object is achieved by a method for transmission of an effective power flow between a first converter and a second converter of an HVDC network, the first and second converter being connected to each other by a first transmission conductor and second transmission conductor, and each converter containing a first DC connection and a second DC connection, wherein the method comprises: forming in a first mode of operation containing a first direction of the effective power flow a first current path comprising the first transmission conductor and the first DC connections of the first and second converter, and a second current path comprising the second transmission conductor (4) and the second DC connections of the first and second converter, and forming in a second mode of operation containing a second direction of the effective power flow a first current path comprising the second transmission conductor (4) and the first DC connections of the first and second converter, and a second current path comprising the first transmission conductor (3) and the second DC connections of the first and second converter.

In a third aspect of the invention the object is achieved by a computer program product containing instructions for a processor to evaluate the inventive method of electric power transmission of a HVDC network. The computer program may be stored on a computer usable medium. The computer program product may also be provided at least in part over a network, such as the Internet.

BRIEF DESCRIPTION OF THE DRAWINGS

Other features and advantages of the present invention will become more apparent to a person skilled in the art from the following detailed description in conjunction with the appended drawings in which.

DESCRIPTION OF PREFERRED EMBODIMENTS

Figure 1:
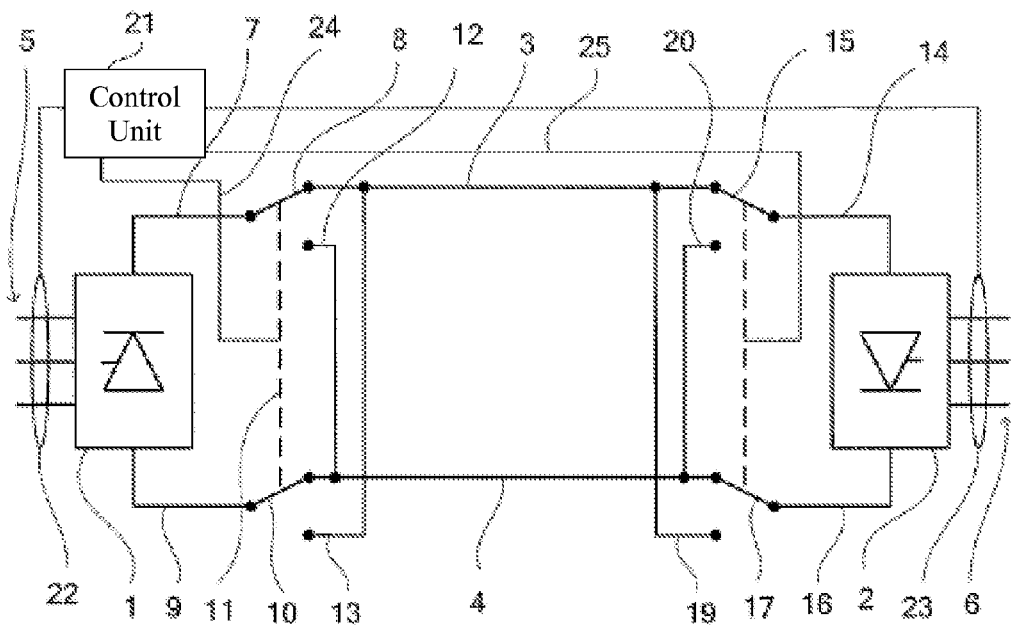
FIG. 1 is a principal circuit diagram of a HVDC network according the invention.

An HVDC network according to the invention is in FIG. 1. The HVDC network comprises a first converter 1 and a second converter 2 connected to each other by a first transmission conductor 3 and a second conductor 4. The first converter is connected to a first AC network 5 and the second converter is connected to a second AC network 6. The first converter comprises a first DC connection 7 having a first switch 8 and a second DC connection 9 having a second switch 10. The first and second switch are operated in parallel with a first link 11. The first switch comprises a first contact part in connection with the first transmission conductor 3 and a second contact part connected via an intermediate link 12 to the second transmission conductor 4. The second switch comprises a first contact part in connection with the second transmission conductor and a second contact part connected via an intermediate link 13 to the first transmission conductor 3.

The second converter 2 comprises a first DC connection 14 having a first switch 14 and a second DC connection 16 having a second switch 17. The first and second switch are operated in parallel with a second link 18. The first switch comprises a first contact part in connection with the first transmission conductor 3 and a second contact part connected via an intermediate link 20 to the second transmission conductor 4. The second switch comprises a first contact part in connection with the second transmission conductor and a second contact part connected via an intermediate link 18 to the first transmission conductor 3.

In a first mode of operation as showed in FIG. 1, representing an effective power transmission in a first direction, the first switch 8 of the first converter 1 is connecting the first DC connection 7 with the first transmission conductor 3 and the second switch 10 is connecting the second DC connection 9 with the second transmission conductor 4. The first switch 15 of the second converter 2 is connecting the first DC connection 14 with the first transmission conductor 3 and the second switch 17 is connecting the second DC connection 16 with the second transmission conductor 4.

In a second mode of operation, representing an effective power transmission in second direction, opposite the first direction, the first and second switches of the first and second converter are assuming its second positions. Thus in this mode of operation the first DC connection of the first and second converter are connected to the second transmission conductor. Simultaneously the second DC connection of the first and second converter are connected to the first transmission conductor.

The HVDC network comprises according to the embodiment showed in FIG. 1 a control unit 21 for controlling the switches. The control unit comprises a first sensing means 22 and a second sensing means 23 for sensing the direction of the effective power transmission direction. The control unit further comprises a first actuator means 24 for controlling the first and second switch of the first converter and a second actuator means 25 for controlling the first and second switch of the second converter.

Figure 2:
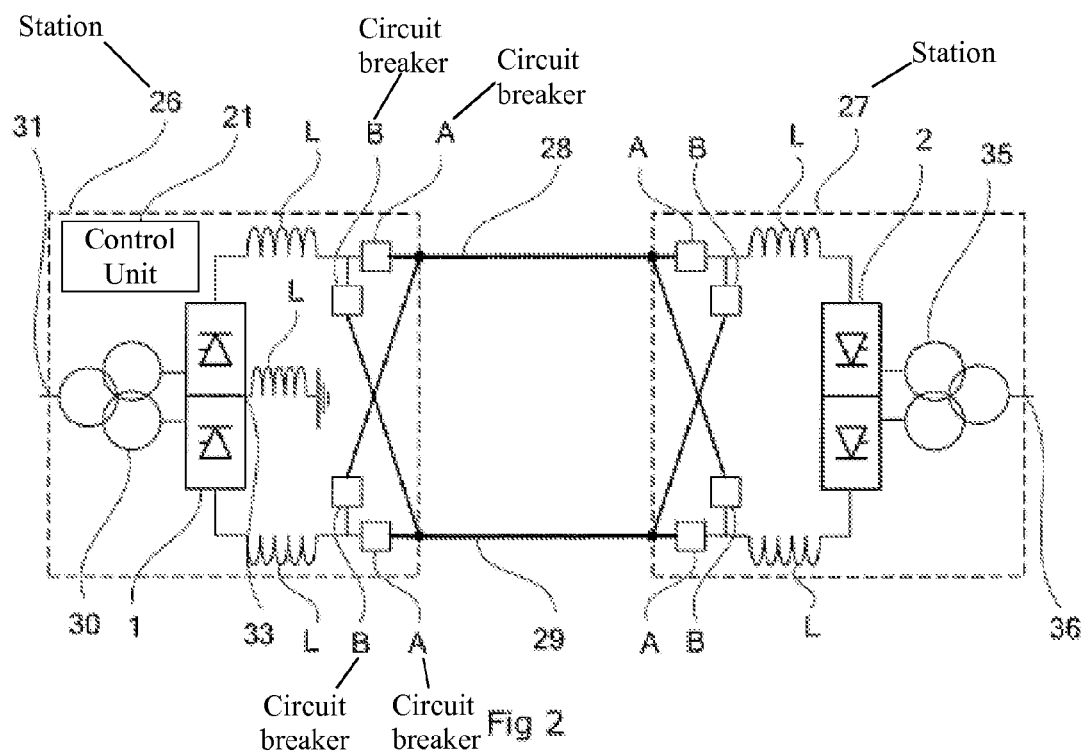
FIG. 2 is an embodiment of an HVDC network with a switching arrangement comprising a plurality of circuit breakers.

In the embodiment shown in FIG. 2 the HVDC network comprises a first station 26 and a second station 27 connected with each other by a first cable 28 and a second cable 29. A cable in this embodiment comprises a high voltage cable with an insulating layer containing a polymeric material. The first station comprises a first transformer 30 connected in a first grid point 31 to a first AC network. Further the first station comprises a first converter 1 containing a first and second thyristor valve having a first DC connection including a reactor 32 and a second DC connection having a reactor 32. The first station also comprises a midpoint ground connection 33 which in this embodiment comprises a reactor 32.

The second station comprises a second transformer 35 connected in a second grid point 36 to a second AC network. Further the second station comprises a second converter 2 containing a first and second thyristor valve having a first DC connection including a reactor L and a second DC connection having a reactor L. The second station comprises no midpoint ground connection.

The embodiment of the HVDC shown in FIG. 2 further comprises a switching arrangement containing a first and second circuit breaker. Thus with the same function as in the embodiment shown in FIG. 1 the first switch 8 of the first converter 1 and the first switch 15 of the second converter 2 respectively comprises in the embodiment of FIG. 2 a first circuit breaker A and a second circuit breaker B. Likewise the second switch 10 of the first converter 1 and the second switch 17 of the second converter 2 respectively comprises a first circuit breaker A and a second circuit breaker B. Hence, when the switch assumes its first position this is effected by closing the first circuit breaker A and opening the second circuit breaker B. Consequently when the switch assumes its second position this is effected by opening the first circuit breaker A and closing the second circuit breaker B.

In the first mode of operation all of the first circuit breakers A are opened and all of the second circuit breakers B are closed. In the second mode of operation all of the first circuit breakers A are closed and all of the second circuit breakers B are opened.

By the use of this switching arrangement the current flow may be alternated between the first and second cable such that the potential of each cable never changes. This makes possible the use of cables having an insulation comprising a polymer.

Although favorable the scope of the invention must not be limited by the embodiments presented but contain also embodiments obvious to a person skilled in the art. For instance any embodiment of a classic HVDC network, such as a single line HVDC transmission having earth electrodes as well as a bipolar HVDC transmission are included in the scope of the invention.

The invention claimed is:

1. An HVDC network, comprising:
   a first station comprising a first converter comprising non-extinguishable semiconducting elements;
   a second station comprising a second converter comprising non-extinguishable semiconducting elements,
   a first transmission conductor comprising a cable including a polymeric insulation and interconnecting the first converter with the second converter, and
   a second transmission conductor interconnecting the first converter with the second converter,
   wherein the first station further comprises a first switching arrangement and the second converter further comprises a second switching arrangement for alternating a direction of a power flow between the first and second transmission conductor, and wherein the first station further comprises a control unit for controlling the first switching arrangement and simultaneously controlling the second switching arrangement based on a desired direction of the power flow, the control unit comprising a first sensor at an AC network connection of the first converter and a second sensor at an AC network connection of the second converter for sensing the direction of the power flow.

2. The HVDC network according to claim 1, wherein the first switching arrangement comprises a first switch and a second switch, and wherein the second switching arrangement comprises a first switch and a second switch.

3. The HVDC network according to claim 2, wherein each of the first switch and the second switch comprises a first circuit breaker and a second circuit breaker.

4. The HVDC network according to claim 1, wherein the second transmission conductor comprises a cable including a polymeric insulation.

5. A computer program product, comprising:
   a non-transitory computer readable medium; and
   computer program instructions recorded on the computer readable medium and executable by a processor to carry out a for transmission of an effective power flow between a first converter and a second converter of an HVDC network, each converter comprising non-extinguishable semiconducting elements, the first and second converter being connected to a first AC network and a second AC network, respectively, and to each other by a first transmission conductor and a second transmission conductor, wherein the first transmission conductor comprises a cable including a polymeric insulation, the first converter comprising a first DC connection, a second DC connection, and the second converter comprising a first DC connection and a second DC connection, the method comprising:
   forming, based on sensing of the power flow direction at the AC connection of the first converter and at the AC connection of the second converter, in a first operation mode comprising a first direction of the effective power flow a first current path comprising the first DC connection of the first converter, the first transmission conductor and the first DC connection of the second converter, and a second current path comprising the second DC connection of the first converter, the second transmission conductor and the second DC connection of the second converter, and
   forming, based on sensing of the power flow direction at the AC connection of the first converter and at the AC connection of the second converter, in a second mode of operation comprising a second direction of the effective power flow a first current path comprising the first DC connection of the first converter, the second transmission conductor and the first DC connection of the second converter, and a second current path comprising the second DC connection of the first converter, the first transmission conductor and the second DC connection of the second converter, wherein forming the first and second current path comprises simultaneously operating a first switching arrangement of the first converter and a second switching arrangement of the second converter.

6. The computer program product according to claim 5 wherein the computer program instructions are further for providing the computer program instructions at least in part over a network.

7. The computer program product according to claim 6, wherein the network is the internet.

8. A method for transmission of an effective power flow between a first converter and a second converter of an HVDC network, each converter comprising non-extinguishable semiconducting elements, the first and second converter being connected to a first AC network and a second AC network, respectively, and to each other by a first transmission conductor and a second transmission conductor, wherein the first transmission conductor comprises a cable including a polymeric insulation, the first converter comprising a first DC connection, a second DC connection, and the second converter comprising a first DC connection and a second DC connection, the method comprising:

forming, based on sensing of the power flow direction at the AC connection of the first converter and at the AC connection of the second converter, in a first operation mode comprising a first direction of the effective power flow a first current path comprising the first DC connection of the first converter, the first transmission conductor and the first DC connection of the second converter, and a second current path comprising the second DC connection of the first converter, the second transmission conductor and the second DC connection of the second converter, and forming, based on sensing of the power flow direction at the AC connection of the first converter and at the AC connection of the second converter, in a second mode of operation comprising a second direction of the effective power flow a first current path comprising the first DC connection of the first converter, the second transmission conductor and the first DC connection of the second converter, and a second current path comprising the second DC connection of the first converter, the first transmission conductor and the second DC connection of the second converter, wherein forming the first and second current path comprises simultaneously operating a first switching arrangement of the first converter and a second switching arrangement of the second converter.

* * * * *

UNITED STATES PATENT AND TRADEMARK OFFICE
CERTIFICATE OF CORRECTION

| | | |
|---|---|---|
| PATENT NO. | : 8,441,817 B2 | Page 1 of 1 |
| APPLICATION NO. | : 12/158738 | |
| DATED | : May 14, 2013 | |
| INVENTOR(S) | : Paajarvi | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1303 days.

Signed and Sealed this
Thirtieth Day of September, 2014

Michelle K. Lee
*Deputy Director of the United States Patent and Trademark Office*